US008408868B2

(12) United States Patent
Hatman

(10) Patent No.: US 8,408,868 B2
(45) Date of Patent: Apr. 2, 2013

(54) METHODS, SYSTEMS AND/OR APPARATUS RELATING TO INDUCERS FOR TURBINE ENGINES

(75) Inventor: Anca Hatman, Easley, SC (US)

(73) Assignee: General Electric Company, Schenectady, NY (US)

( * ) Notice: Subject to any disclaimer, the term of this patent is extended or adjusted under 35 U.S.C. 154(b) by 1049 days.

(21) Appl. No.: 12/346,255

(22) Filed: Dec. 30, 2008

(65) Prior Publication Data

US 2010/0166549 A1 Jul. 1, 2010

(51) Int. Cl.
*F01D 9/00* (2006.01)
(52) U.S. Cl. ........................................ 415/207; 416/96 R
(58) Field of Classification Search .................. 415/183, 415/186, 57.1, 58.4, 173.6, 174.5, 207; 416/196 R, 416/96 R; 60/785
See application file for complete search history.

(56) References Cited

U.S. PATENT DOCUMENTS

| 4,638,628 | A | * | 1/1987 | Rice | 60/772 |
| 4,838,759 | A | * | 6/1989 | Dunn et al. | 415/143 |
| 5,236,301 | A | * | 8/1993 | Palmer | 415/116 |
| 5,279,109 | A | * | 1/1994 | Liu et al. | 60/785 |
| 5,636,993 | A | * | 6/1997 | Badry | 454/263 |
| 6,540,477 | B2 | * | 4/2003 | Glynn et al. | 415/115 |
| 7,048,497 | B2 | * | 5/2006 | Arilla et al. | 415/116 |
| 2004/0247429 | A1 | * | 12/2004 | Arilla et al. | 415/116 |
| 2005/0129500 | A1 | * | 6/2005 | Stangeland | 415/1 |

* cited by examiner

*Primary Examiner* — Caridad Everhart
(74) *Attorney, Agent, or Firm* — Mark E. Henderson; Ernest G. Cusick; Frank A. Landgraff

(57) ABSTRACT

An inducer that includes a profiled throat. In some embodiments, the inducer includes a conical shape upstream of the profiled throat with a relatively large circular inlet that narrows to the profiled throat and, downstream of the profiled throat, a downstream section that broadens from the profiled throat. The profiled throat may include an approximate convergent-divergent nozzle geometry.

13 Claims, 2 Drawing Sheets

METHODS, SYSTEMS AND/OR APPARATUS RELATING TO INDUCERS FOR TURBINE ENGINES

BACKGROUND OF THE INVENTION

This present application relates generally to methods, systems, and/or apparatus for improving the efficiency and/or operation of turbine engines, which, as used herein and unless specifically stated otherwise, is meant to include all types of turbine or rotary engines, including gas turbine engines, aircraft engines, steam turbine engines, and others. More specifically, but not by way of limitation, the present application relates to methods, systems, and/or apparatus pertaining to improved inducer design for turbine engines.

Gas turbine engines typically include cooling systems that provide cooling air to turbine rotor components, such as turbine blades, in order to limit the temperatures experienced by such components. Prior art cooling systems usually acquire the air used to cool turbine components from the engine's compressor, after which it is diverted and subsequently directed to the turbine section of the engine through an axial passageway. A device commonly known as a radial-axial inducer is generally located at the exit end of such an axial passageway. In general terms, an inducer is a device used to accelerate and direct a flow of air in a gas turbine engine. Primarily, inducers are used to re-direct the axial flow of air bled from the compressor such that the flow is tangential to and in the same direction of the rotating rotor, which is why these component are often referred to as radial-axial inducers. Re-directing the flow of air in this manner allows it to more efficiently pass through rotating holes in the rotating rotor. In this way, the cooling air may move downstream and supply, for example, the cooling channels formed in hollow airfoils. In addition, inducers reduce the pressure of the cooling air, which reduces the relative temperature of the flow. The reduction in temperature, of course, allows the flow of compressed air to more effectively cool downstream components.

Conventional inducers are often described as having a "trumpet" appearance, as they generally have a conical shape that narrows from a large circular opening at the upstream end. As one of ordinary skill in the art will appreciate, the conical shape narrows to a throat, which represents the narrowest cross-section of the inducer. From the throat, the inducer has an approximate cylindrical profile that extends to an outlet at the trailing edge. The outlet generally has a highly optimized geometry that is fine-tuned for efficient aerodynamic performance.

It is not uncommon for field conditions or other variables to require that the throat be machined, i.e., enlarged, so that better performance may be obtained. These adjustments, for example, may be required so that an adequate supply of cooling air is delivered downstream. However, conventional inducer design that includes a cylindrical region extending from the throat to the trailing edge, makes such improvements substantially impossible without distorting or causing damage to the optimized geometry of the trailing edge. As a result, there remains a need for an improved inducer design that allows for a cost-effective method of adjusting throat geometry.

BRIEF DESCRIPTION OF THE INVENTION

The present application thus describes an inducer that includes a profiled throat. In some embodiments, the inducer includes a conical shape upstream of the profiled throat with a relatively large circular inlet that narrows to the profiled throat and, downstream of the profiled throat, a downstream section that broadens from the profiled throat. The profiled throat may include an approximate convergent-divergent nozzle geometry.

The present application further describes a method of operating a gas turbine engine, the method including the steps of: a) installing within the turbine engine an inducer that comprises: a profiled throat that includes an approximate convergent-divergent nozzle geometry, wherein the profiled throat is configured to provide a desired minimum flow level therethrough; a conical shape upstream of the profiled throat with a relatively large circular inlet that narrows to the profiled throat; and downstream of the profiled throat, a downstream section, wherein the downstream section of the inducer is configured to accommodate a desired maximum flow level therethrough; b) upon operating the turbine engine after the installation of the inducer, determining if the flow level through the inducer satisfies an operational criterion; c) if it is determined that the flow level through the inducer does not satisfy the operational criterion and that a greater flow level is needed, machining the profiled throat to increase the cross-sectional area therethrough.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
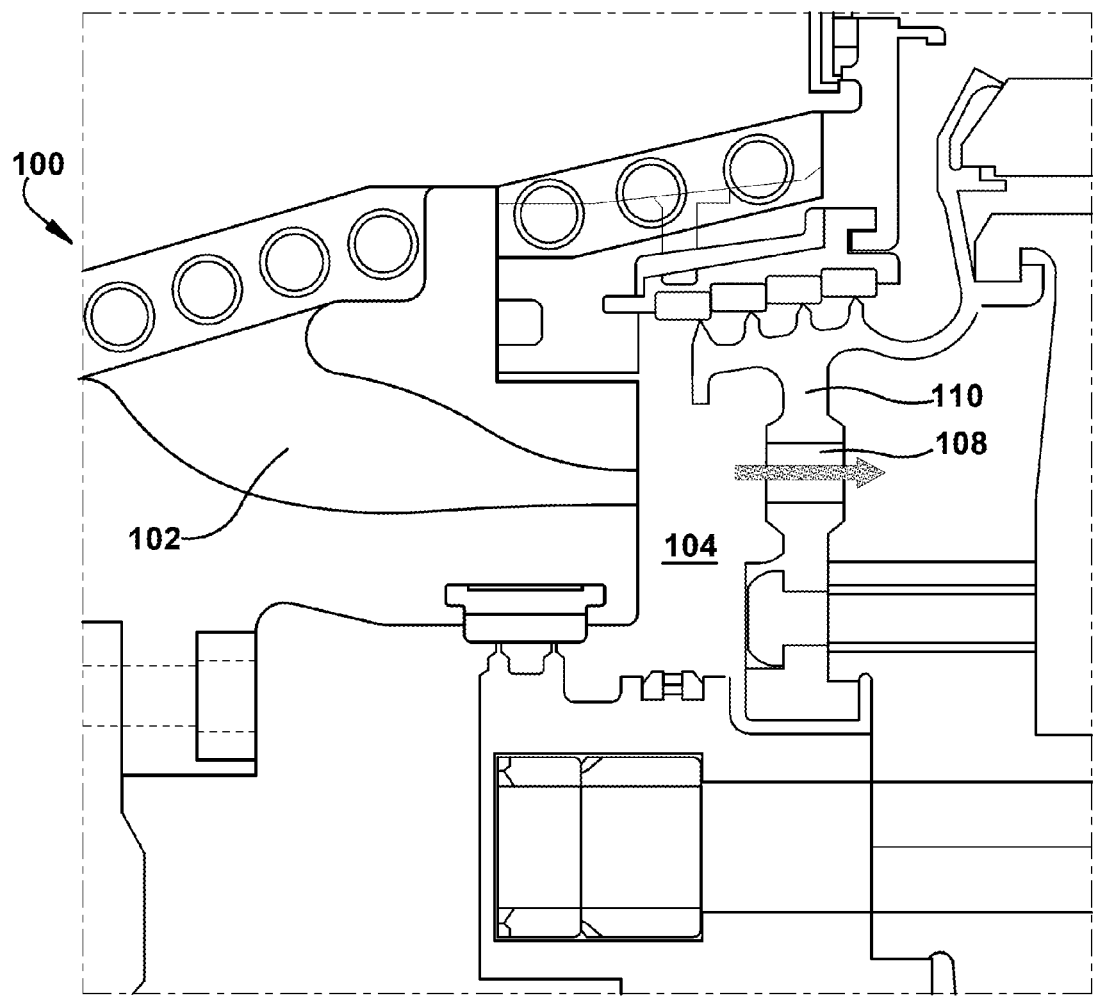
FIG. 1 is a cross-sectional view of an exemplary turbine engine in which certain embodiments of the present application may be used.

Referring now to the figures, FIG. 1 illustrates a schematic representation of a section of a gas turbine engine 100. In general, gas turbine engines operate by extracting energy from a pressurized flow of hot gas that is produced by the combustion of a fuel in a stream of compressed air. A gas turbine engine generally is configured with an axial compressor that is mechanically coupled by a common shaft or rotor to a downstream turbine section or turbine, and a combustor positioned between the compressor and the turbine. Note that the following invention may be used in all types of turbine engines, including gas turbine engines, steam turbine engines, aircraft engines, and others. Hereinafter, the invention will be described in relation to a gas turbine engine. This description is exemplary only and not intended to be limiting in any way.

The compressor generally includes a plurality of axially-stacked stages. Each stage may include a row of compressor rotor blades followed by a row of compressor stator blades. The compressor stator blades generally are circumferentially spaced one from the other and fixed about the axis of rotation. The compressor rotor blades are circumferentially spaced and attached to the shaft, when the shaft rotates during operation, the compressor rotor blades rotates about it. As one of ordinary skill in the art will appreciate, the compressor rotor blades are configured such that, when spun about the shaft, they impart kinetic energy to the air or working fluid flowing through the compressor.

The turbine of a gas turbine engine also may include a plurality of stages. Each stage includes a plurality of turbine buckets or turbine rotor blades, which rotate about the shaft during operation, and a plurality of nozzles or turbine stator blades, which remain stationary during operation. The turbine stator blades generally are circumferentially spaced one from the other and fixed about the axis of rotation. The turbine rotor blades may be mounted on a turbine wheel for rotation about the shaft. It will be appreciated that the turbine stator blades and turbine rotor blades lie in the hot gas path of the turbine.

In use, the rotation of compressor rotor blades within the axial compressor compresses a flow of air. In the combustor, energy may be released when the compressed air is mixed with a fuel and ignited. The resulting flow of hot gases from the combustor then is directed over the turbine rotor blades, which may induce the rotation of the turbine rotor blades about the shaft, thus transforming the energy of the hot flow of gases into the mechanical energy of the rotating blades and, because of the connection between the rotor blades in the shaft, the rotating shaft. The mechanical energy of the shaft may then be used to drive the rotation of the compressor rotor blades, such that the necessary supply of compressed air is produced, and also, for example, a generator to produce electricity.

Gas turbine engines typically include cooling systems that provide compressed cooling air to turbine rotor components, such as turbine blades, in order to limit the temperatures experienced by such components. The cooling systems generally acquire the air used to cool turbine components from the compressor. From the compressor, as described in more detail below, the cooling air is diverted and subsequently directed to the turbine section of the engine through an axial passageway.

As one of ordinary skill the art will appreciate, FIG. 1 depicts a section of the gas turbine engine 100 that is radially inward of the approximate axial location of the downstream end of the compressor and the upstream end of the turbine. As shown, an inducer 102 is configured to gather compressed air at an upstream opening and accelerate the flow through a narrowing geometry, providing a passageway to a rotor/stator cavity 104. In general terms, an inducer is a device used to accelerate and direct a flow of air. The inducer 102, as depicted, is a radial-axial inducer. This is exemplary only. As previously stated, the present invention may be used in other types of inducers, including, for example, purely axial inducers, purely radial inducers and other similar functioning components.

The inducer 102 of FIG. 1 is used to re-direct the axial flow of air bled from the compressor such that the resulting flow is tangential to and in the same direction of the rotating rotor. Re-directing the flow of air in this manner allows it to more efficiently pass through (as depicted by the shaded arrow) a plurality of rotor holes 108 that is formed in the rotating rotor 110. In this manner, the cooling air from the compressor is directed downstream such that it may supply, for example, the cooling channels formed in hollow airfoils. In addition, as one of ordinary skill in the art will appreciate, the geometry of the radial-axial inducer 102 functions to reduce the pressure of the cooling air, which reduces the relative temperature of the cooling air. This reduction in temperature allows the flow of compressed air from the inducer 102 to be a more effective coolant to downstream components.

Figure 2:
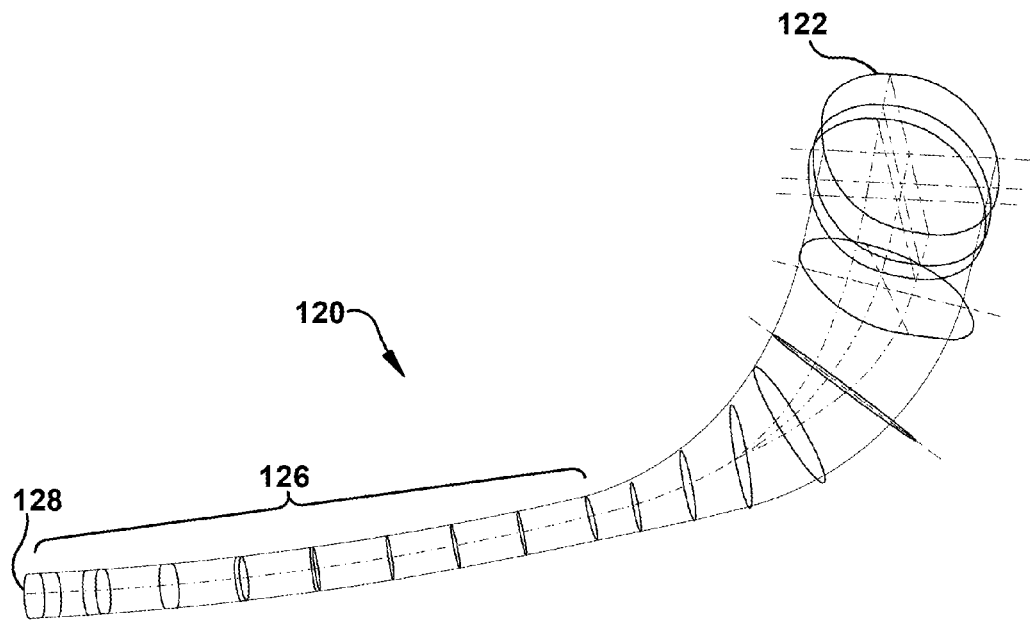
FIG. 2 is a view of a conventional inducer design with a cylindrical throat.

FIG. 2 illustrates the form of a conventional inducer 120. As shown, the axial-radial inducer 120 has a general "trumpet" appearance that includes a conical shape that narrows from a large circular inlet 122 at the upstream end. The conical shape narrows through the upstream section and arrives at an upstream end of the throat 126. The throat 126 represents the section of the inducer 120 that has the narrowest cross-sectional area. With conventional design, the throat 126 generally comprises an extended approximate cylindrical section that extends from an upstream end to an outlet 128 at the trailing edge. Through the throat 126, the inducer 120 maintains an approximate constant circular cross-sectional shape. In addition, through the throat 126, the inducer 120 maintains substantially the same cross-sectional area.

The outlet 128 at the trailing edge of the inducer 120 generally has a highly optimized geometry that is fine-tuned for efficient aerodynamic performance. (Note that such optimized geometry is not depicted in FIG. 2.) As described in more detail above, because of the narrowness and/or general configuration through the throat 126 in conventional inducer design, any adjustment that is meant to enlarge the throat or allow increase flow therethrough, necessarily damages the optimized geometry of the trailing edge.

Figure 3:
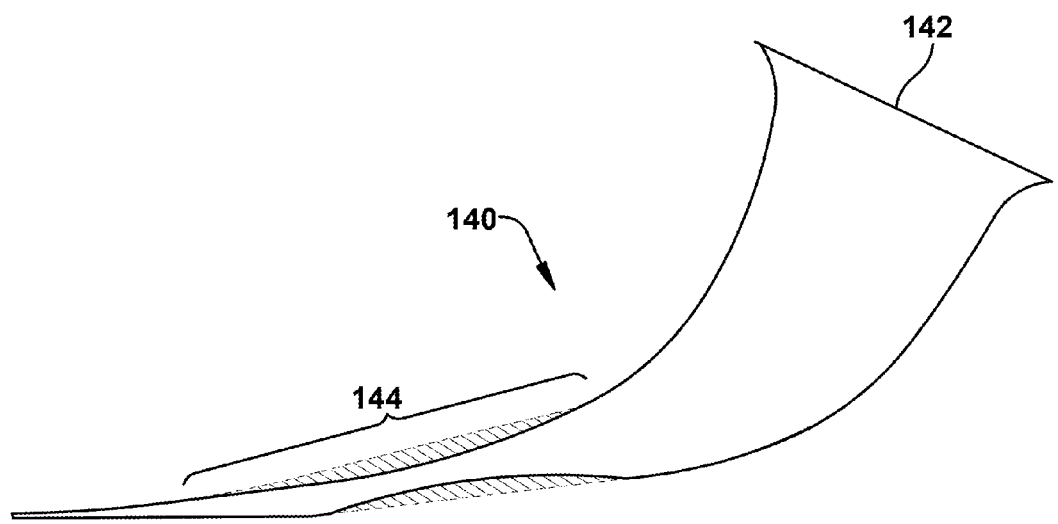
FIG. 3 is a sectional view of an inducer throat design according to exemplary embodiments of the present application.

FIG. 3 illustrates a cross-sectional view of a schematic plan of an inducer throat design according to exemplary embodiments of the present application. As described above, this throat design may be employed in any type inducer. As illustrated, an inducer 140 has a conical shape that narrows from a large circular inlet 142 at the upstream end. The conical shape narrows through the upstream section and arrives at a profiled throat section or profiled throat 144. Consistent with the present invention, the profiled throat 144 generally provides the following: 1) an upstream narrowing; 2) a narrow mid-section; and 3) a downstream broadening. In this manner, the profiled throat 144 forms an approximate "hourglass" or bottleneck profile. The narrowing and broadening of the profiled throat comprise a gradual or smooth curve or conical shape, i.e., the upstream narrowing provides a conical shape that is broader at the upstream end than it is at the downstream end and the downstream narrowing provides a conical shape that is narrower at the upstream end than it is at the downstream end. That is, the profiled throat 144 forms a convergent-divergent nozzle profile.

As illustrated in cross-sectional view, the narrow mid-section may comprise the radially inward crest of the hump that is formed from the joining of the upstream narrowing and the downstream broadening and, thus, forms the narrowest passageway through the inducer 140, i.e., the passageway with the least cross-sectional area. The cross-hatched area represents the approximate difference between the profiled throat 144 in accordance with the present application and a what a cylindrical section or throat would be if the cross-section area near the exit is maintained constant as the throat extends upstream. As shown in the cross-sectional view of FIG. 3, the narrow mid-section appears to be a crest that falls away to each side or, as stated, a convergent-divergent nozzle profile. In some embodiments, the narrow mid-section may have a more extended axial length that has an approximate constant cross-sectional area and geometry.

In preferred embodiments, the narrow mid-section is sized for a desired minimum flow level. That is, the narrow mid-section is provided with a cross-sectional geometry and area that is believed necessary to provide the minimum flow level likely to satisfy an operational criterion of the turbine engine, which, for example, might be the minimally sufficient flow level of cooling air at an acceptable pressure and/or temperature for adequate downstream cooling. As stated, the downstream section of the inducer 140 (i.e., the section downstream of the profiled throat 144) broadens to a cross-sectional area that is greater than the narrow mid-section of the profiled throat 144. In preferred embodiments, the downstream section is sized to accommodate a desired maximum flow level. More particularly, the downstream section is provided with a cross-sectional geometry and area that is believed necessary to accommodate the maximum flow level likely to satisfy an operational criterion of the engine.

In use, inducers with a profiled throat 144 according to the present application may be installed within a turbine engine and then adjusted in an efficient and cost-effective manner. The profiled throat 144, which may be cast in place and integral to the surrounding structure that defines the inducer, may be machined such that the minimum cross-sectional area through the inducer is enlarged. For example, upon installation and operation of the turbine engine, it may be determined whether the desired minimum flow level for which the profiled throat 144 was sized is sufficiently meeting engine performance criteria. If it is determined that it is not sufficient and a greater flow level is likely needed, the profiled throat 144 may be machined so that the cross-sectional area of the profiled throat 144 is enlarged. Because of the increased cross-sectional area downstream of the profiled throat, the profiled throat 144 is more accessible than conventional designs and machining may be done without affecting, damaging, or distorting the optimized geometry of the trailing edge outlet. Once the profiled throat 144 is enlarged, further testing may be done to determine if engine performance criteria is now being satisfied, and more machining may be done if necessary. It will be appreciated that this may become an iterative process until the throat is fine tuned and/or the desired engine performance criteria is achieved.

If the downstream section of the inducer is sized to accommodate the desired maximum flow level, then, if necessary, this flow level may be roughly achieved by machining or removing substantially the entire profiled throat 144. In this case, the throat section would come to resemble the cylindrical section of conventional design. Thereby, the sizing of the downstream section ensures that an anticipated maximum is attainable if needed and inducer throat geometry becomes flexible, allowing efficient and cost-effective adjustment and fine-tuning in the field. Because of the increased accessibility due to the increased cross-section area downstream of the profiled throat, the machining may be done without affecting or damaging the optimized geometry of the trailing edge outlet. Of course, as one of ordinary skill in the art may appreciate, operating with an inducer that has a convergent-divergent throat design may have a small negative affect on the aerodynamic performance of the inducer when compared to a conventional cylindrical design that does not require any field adjustment. It has been determined, however, that these potential negative considerations are very likely substantially outweighed by the efficiencies that may be achieved with an inducer throat design that allows flexible and efficient adjustment and fine-tuning without damaging the trailing edge outlet geometry. That is, any negative impact associated with a profiled throat according to the present invention is likely far less than the performance penalty that would result from the type of damaged sustained by the exit geometry due to field modifications of conventional inducers. Certainly, at the very least, it is highly likely that there are circumstances and applications where that potential trade-off is one that is desirable.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

I claim:

1. An inducer that includes a profiled throat, wherein the inducer is a radial-axial inducer and is configured to direct and accelerate a flow of cooling gas in a gas turbine engine;
   the inducer comprises a conical shape upstream of the profiled throat with a relatively large circular inlet that narrows to the profiled throat and, downstream of the profiled throat, a downstream section that broadens from the profiled throat.

2. The inducer according to claim 1, wherein the profiled throat comprises an approximate convergent-divergent nozzle geometry.

3. The inducer according to claim 1, wherein the profiled throat comprises an upstream narrowing, a narrow mid-section, and a downstream broadening.

4. The inducer according to claim 3, wherein:
   the upstream narrowing of the profiled throat comprises an approximate smooth conical shape that is broader at an upstream end than it is at a downstream end; and
   the downstream broadening of the profiled throat comprises an approximate smooth conical shape that is narrower at an upstream end than it is at a downstream end.

5. The inducer according to claim 4, wherein the smooth conical shape of the upstream narrowing and the downstream broadening comprises one of a curved conical shape and a linear conical shape.

6. The inducer according to claim 4, wherein the narrow mid-section comprises the narrowest section through the throat and resides between the upstream narrowing and downstream broadening.

7. The inducer according to claim 4, the narrow mid-section comprises the most narrow passageway through the inducer, wherein the most narrow passageway comprises the passageway with the least cross-sectional area.

8. The inducer according to claim 4, wherein the narrow mid-section comprises an inward radial crest between the narrowing of the upstream narrowing and the downstream broadening.

9. The inducer according to claim 4, wherein the narrow mid-section has an extended axial length of an approximate constant cross-sectional area.

10. The inducer according to claim 1, wherein the profiled throat is originally configured to provide a desired minimum flow level therethrough.

11. The inducer according to claim 10, wherein the desired minimum flow level comprises the minimum flow level that is believed necessary to satisfy an operational criterion.

12. The inducer according to claim 1, wherein the downstream section of the inducer is configured to accommodate a desired maximum flow therethrough.

13. The inducer according to claim 12, wherein the desired maximum flow level comprises the maximum flow level that is believed necessary to satisfy an operational criterion.

* * * * *